April 29, 1947.  N. H. YOUNG, JR  2,419,620

OBSTACLE DETECTION APPARATUS

Filed July 24, 1942  2 Sheets-Sheet 1

INVENTOR
NORMAN H. YOUNG, JR.
BY R. P. Morris
ATTORNEY

April 29, 1947.  N. H. YOUNG, JR  2,419,620
OBSTACLE DETECTION APPARATUS
Filed July 24, 1942  2 Sheets-Sheet 2

INVENTOR
NORMAN H. YOUNG, JR.
BY
ATTORNEY

Patented Apr. 29, 1947

2,419,620

UNITED STATES PATENT OFFICE 2,419,620

OBSTACLE DETECTION APPARATUS

Norman H. Young, Jr., Jackson Heights, N. Y., assignor to Federal Telephone and Radio Corporation, a corporation of Delaware Application July 24, 1942, Serial No. 452,240

17 Claims. (Cl. 250—1.66)

1

This invention relates to obstacle detection apparatus of the character utilizing pulse reflections received in response to a transmitted pulse to determine the location of aircraft and other obstacles.

The location of an obstacle causing a particular reflection pulse in response to a transmitted pulse is determined by maximizing the reflection pulse. To maximize a given reflection pulse, the directivity of the antenna system of the apparatus is varied until the pulse passes through its maximum amplitude. The angular position of the antenna system at the maximum indication gives the direction or azimuth and angle of elevation of the obstacle with respect to the detection apparatus. The distance to the obstacle is indicated by the position of the reflection pulse from a reference point on the oscillograph screen.

Heretofore, the practice has been to apply a substantial gain to the pulses appearing on the oscillograph of the detection apparatus so that the maxima of the reflection pulse may be easily determined as the directivity of the antenna system is varied. This practice, however, so amplifies or reduces the gain, as the case may be, of the other reflection pulses present as to drive, on the one hand the stronger pulses off scale and therefore out of the field of view of the operator, or to so diminish, on the other hand, the weaker pulses as to render it extremely difficult to observe their presence. This effect is undesirable because the operator should be able to see all of the pulses including the weaker ones while keeping track of the pulse the operator is trying to maximize, in order to be informed at all times of the presence of other nearby airplanes or other obstacles represented by the other pulses. Again, if the equipment associated with the oscillograph be adjusted to give maximum gain in the peak region only of a selected pulse, it may happen that the gain for very weak pulses is insufficient.

One of the objects of this invention, therefore, is to overcome these difficulties and provide means and method for enabling the operator to detect and maximize a particular reflection pulse and at the same time maintain other reflection pulses present at observable amplitudes.

Another object of this invention is to provide means and method to enable an operator to easily and accurately maximize a given pulse for the determination of the direction to and the elevation of the obstacle causing such reflection.

Another object of the invention is to provide oscillograph apparatus and method whereby the oscillograph screen is caused to have two regions by which weak and strong pulses may be maximized or otherwise examined or compared with other pulses, and while the other pulses present are maintained at observable amplitudes.

Still another object of the invention is to provide amplifier means having two amplifying or gain characteristics wherein one of the characteristics is normally fixed and the other is adjustable with respect thereto.

The above objects and others ancillary thereto are accomplished in accordance with this invention by improving obstacle detection apparatus of the type using an oscillograph to indicate the received reflection pulses caused by the presence of aircraft or other obstacles in response to a transmitted pulse. The improvement comprises the method of applying to the received pulses a first voltage input amplification up to a predetermined level to effect a gain to impulse amplitudes below such predetermined level and to clip off the portions of pulses extending above such level; applying to at least certain of the received pulses in addition to the first amplification a second voltage input amplification up to a second voltage level to effect a gain to the portions of pulses extending into the range of the second amplification region and to clip off any pulse portions extending above this second predetermined level. This second voltage input amplification is variable so that the range thereof may be varied to selectively include in the region thereof the peak portion of any pulse extending above the predetermined voltage level of the first amplification region. Such selected pulse may then be maximized easily and accurately along the linear portion of the amplification gain, the maximizing, of course, being effected by varying the directivity of the antenna system of the apparatus.

More particularly, the means for accomplishing this two-regional gain characteristic for the received pulses comprises two amplifier tubes connected in parallel to which the pulses are fed. One of these tubes is normally provided with a fixed negative bias whereby the weak reflection pulses are given high gain and the strong reflection pulses are given low or limited gain. The second of these tubes is provided with means to vary the negative bias thereof through a long range so as to shift the gain range of the second amplification characteristic with respect to the saturation voltage level of the first amplification region.

The gain of the second tube may be added directly to the gain of the first tube to increase the sharpness of the total gain or it may be shifted to extend the linear slope of the first gain or it may be shifted beyond the point of saturation of the first gain. The gain of the first region, for example, may be represented graphically by a linear slope which levels out as it approaches saturation. The second gain may be represented as a second slope extending from some point along the line of saturation of the first gain to a line of saturation for the second gain. The second slope as more particularly described hereinafter, may be shifted relative to the region of the first slope to locate the slope of the second gain in the zone of the peak of a strong pulse which is selected to be maximized.

For a further understanding of the invention, reference may be had to the following detailed description to be read in connection with the accompanying drawings, in which, Fig. 1 is a block diagram of an obstacle detection apparatus embodying this invention;

Figure 1:
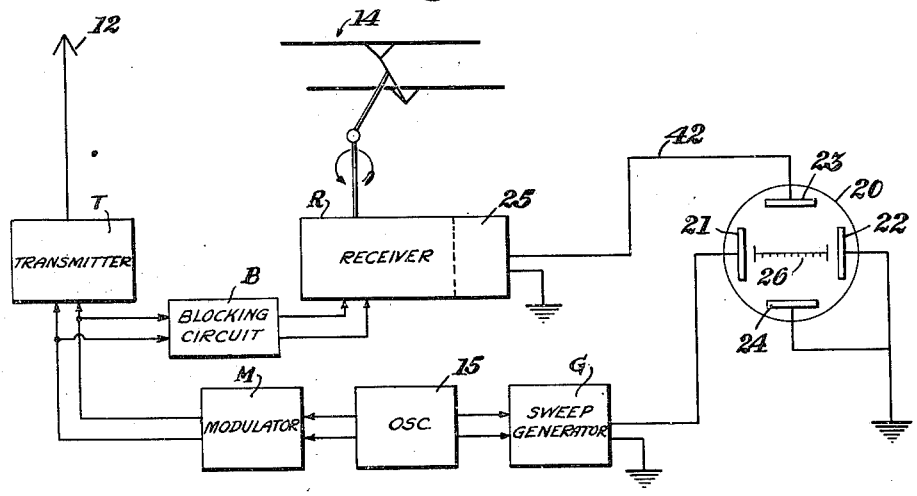

Referring to Fig. 1 of the drawing, the improved obstacle detection apparatus of this invention is shown diagrammatically as comprising a transmitter T for transmitting pulses and a receiver R for receiving reflection pulses caused by the presence of aircraft or other obstacles in the path of the transmitted pulse. The transmitter T is provided with an antenna 12 which may transmit pulses either with or without directive characteristics. The receiver R is preferably provided with a directive antenna system such, for example, as a dipole array 14 which may be rotated for directive azimuth and tilted for elevational angles. If desired, the two antennae 12 and 14 may be replaced by a single antenna.

An oscillator 15 is provided common to the transmitter and the receiver. Energy received from the oscillator 15 may be suitably modulated by a modulator M connected to the transmitter T for transmitting periodic signals. A saw-tooth generator G receives energy from the oscillator 15 and generates horizontal sweep voltages for the plates 21, 22 of the oscillograph 20. The receiver R is provided with the amplifying feature 25 of this invention and is connected to plate 23 of the vertically disposed deflecting plates 23 and 24, the latter of which is connected to ground. For the purpose of blocking the transmitter during the receiving of reflection pulses and, vice versa, the blocking of the receiver during the transmission of pulses by the transmitter T, a suitable blocking circuit B is disposed between the transmitter and receiver.

The fluorescent screen of the oscillograph 20 may be provided with any suitable scale as a distance reference for the reflection pulses received. The scale 26 shown (Figs. 1 and 4 to 6) is chosen for purposes of illustration as extending from 0 to 100 miles. The scale, of course, may start at any distance such as 5 or 10 miles and cover a distance therebeyond of 50, 100 or 200 miles, more or less, as desired. Normally, a large reflection pulse from ground effects would be received at 2 or 3 mile indication from zero but such reflection indication may be blocked off by known means. In the illustrations of the accompanying drawings, ground reflection is omitted as though it were blocked off.

Figure 2:
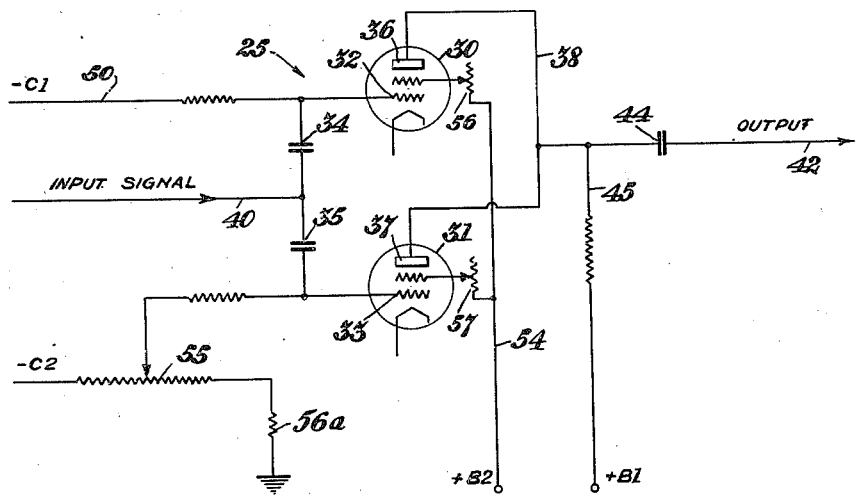
Fig. 2 is a schematic wiring diagram of the amplifier feature of the invention.

As shown in Fig. 2, the amplifier feature of this invention may comprise the final stage of the amplifier circuit of the receiver R. The amplifier 25, however, may be located directly after the detector stage of the receiver or it may comprise one of the several amplifier stages usually provided for the receiver. The amplifier 25 comprises two amplifier tubes 30 and 31 arranged in parallel and which preferably have similar characteristics. The grids 32 and 33 of the two tubes are connected together through suitable condensers 34 and 35 and the anodes 36 and 37 are connected together by a circuit 38. The input signals are fed to the grids 32 and 33 over a connection 40 located between the condensers 34 and 35. The output 42 of the amplifier leads from the anode circuit 38 through a condenser 44. Connected to this circuit prior to the condenser 44 is a battery connection 45 to provide suitable potential B1 for the anodes 36 and 37.

Figure 3:
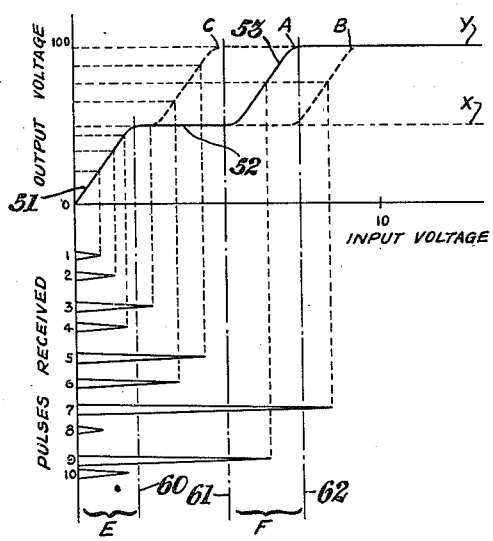
Fig. 3 is a graphic illustration of the amplifier gain characteristics indicating the gain effects thereof upon a number of reflection impulses.

To establish one of the two amplifying gain characteristics of the invention, I provide a normally fixed low negative bias C1 through a lead 50 to the grid 32 of the tube 30. As indicated in Fig. 3, this tube provides a gain indicated by the slope 51 which curves off at an input voltage indicated by line 60 into a substantially horizontal saturation line X. The abscissa of Fig. 3 represents the input voltage, which may be, for example, in the order of 0 to 10 volts, while the ordinates represent the output voltage which may be, for example, in the order of zero to 100 volts. Thus, it will be seen that the slope 51 provides a high voltage gain for the weak pulse amplitudes below the voltage level 60, such as pulses 1, 2, 4, 8, and 10. The saturation line X, however, limits the voltage gain for the stronger pulses such as pulses 3, 5, and 6 causing the output voltages of these three pulses to be clipped off at the saturation line X.

The negative bias C2 of the second amplifier tube 31 is preferably large and is controlled by a rheostat 55. The bias C2 may be, for example, in the order of 2 or 3 times the cut-off voltage of the tube. The negative bias C2 is preferably given a limited minimum value equal to the bias C1 of the tube 30. This is accomplished by providing a fixed resistance 55a between the rheostat 55 and ground.

Figure 7:
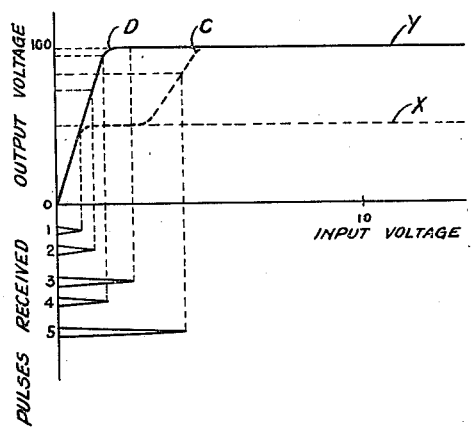
Fig. 7 is a graphic illustration similar to Fig. 3 indicating the curve D which represents another amplifier adjustment.

While the tube 31 may be biased the same as tube 30 and thereby provide a steep gain throughout the lower and upper regions of the oscillograph screen such as shown by the curve D of Fig. 7, the adjustable feature of the grid bias makes it possible to vary the relation of the gain of the tube 31 with respect to the gain of the tube 30 so that the gain of the first tube is adapted to reach saturation a variable period before the second tube reaches cut-off. This saturation period is represented by the portion 52 of the saturation line X (Fig. 3), while the gain effect of the tube 31 is represented by the slope 53 of the solid curve A. As indicated by the curves B and C, the gain of the tube 31 may be adjusted relative to the gain of tube 30.

To restrict the input voltage necessary for saturation of the tubes 30 and 31 and thereby obtain a fairly sharp gain (slopes 51 and 53) I connect by a lead 54 a low positive voltage B2 to the screens of the two tubes 30 and 31. A rheostat may be provided, if desired, for adjustment control of the voltage B2 or as shown, individual rheostats 56 and 57 may be provided for the screens of the two tubes so as to adjust separately the sharpness of the gain slopes thereof. The gain of either tube may thus be adjusted to desired sharpness for the purpose of examining more easily small variations in the shape of a pulse and also for comparing differences in amplitudes or other characteristics of two or more pulses.

Figure 4:
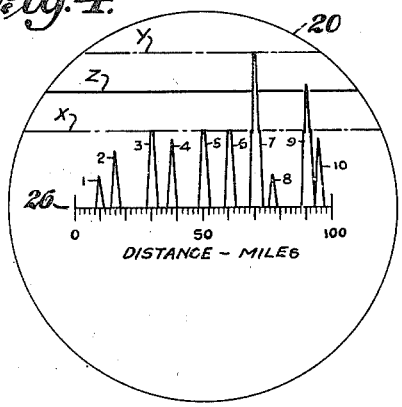
Fig. 4 is a view of the oscillograph screen indicating the appearance of a plurality of reflection pulses in accordance with the amplifier gain adjustment indicated by the curve A of Fig. 3.

Assume, for a particular adjustment of the negative bias for the amplifier tubes 30 and 31, the oscillograph 20 will indicate reflection pulses 1 to 10 as shown in Fig. 4. These pulses for this setting will have the amplitudes which correspond to the output voltage gain indicated, for example, by the curve A in the chart of Fig. 3. Reflection pulses 1, 2, 4, 8 and 10 being weak do not extend to the voltage input level 60 and therefore, may be maximized along a linear portion of the slope 51 by varying the directivity of the antenna system 14. It will also be clear that the reflection pulse 9 the peak of which comes within the amplification range of tube 31 may also be maximized by varying the directivity of the antenna system 14. The reflection pulses 3, 5, and 6 which intercept the voltage input level 60 are clipped off by the saturation line X, and the pulse 7 which intercepts the voltage input level 62 is clipped off by the saturation line Y. The pulses 3, 5, 6 and 7 for this setting (curve A) cannot be properly maximized and a change in the negative bias C2 will be necessary.

Figure 5:
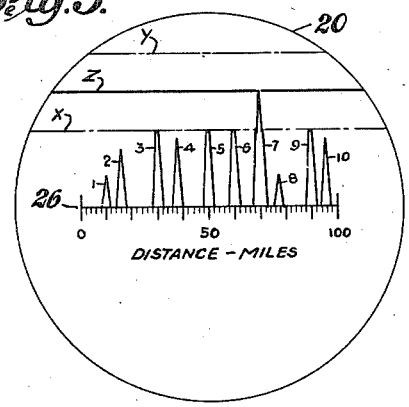
Figs. 5 and 6 are views of the oscillograph screen showing the pulse appearances similar to those of Fig. 4 for the amplifier adjustments indicated by the curves B and C, respectively, of Fig. 3.

Taking the pulse 7, this pulse may be maximized by adjusting the rheostat 55 to vary the negative bias C2 of the tube 31 and thereby shift the gain or amplification range thereof to the peak zone of the pulse 7. This is indicated by the broken curve B of Fig. 3. The results of this adjustment on the oscillograph indications are illustrated in Fig. 5. It will be noted here that the slope of curve B is brought into the zone of the peak of the pulse 7 and the maximum thereof may be easily and accurately determined by varying the directivity of the antenna system 14. A reference line such as Z may be provided on the screen 20 to assist the operator to determine the maxima of the strong pulses.

It will be noted that the reflection pulses 1, 2, 4, 8 and 10 and the pulses 3, 5 and 6 have not been changed by the adjustment to curve B. The strong pulse 9, however, now penetrates the saturation line X to the left of the slope of the curve B, and it, therefore, is reduced or clipped off to the amplitude level of the pulse indications 3, 5 and 6. It will be clear that the weaker and stronger pulses which are present with pulse 7 are maintained in accordance with this invention at observable amplitudes during the maximizing of the pulse 7 so that the operator will be constantly aware of the presence of aircraft or reflecting obstacles represented thereby. This feature will also aid him to maintain observation of the particular pulse which he desires to maximize.

Figure 6:
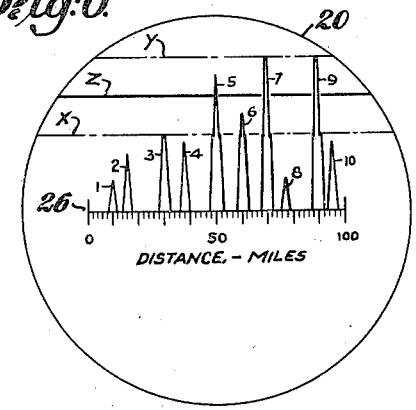

Curve C of Fig. 3 represents still another adjustment condition of the negative bias of the tube 31. This adjustment may be made for maximizing the pulses 5 and 6. The peak of these two pulses are in alignment with the slope portion of curve C and therefore will appear in the upper region of the oscillograph screen as indicated in Fig. 6. It will be observed that the peaks of the pulses 7 and 9 extend above the upper input voltage level (Fig. 3) and are therefore clipped off by the saturation line Y. The pulses 7 and 9 for this adjustment of the tube 31 cannot, of course, be maximized, and to effect the maximizing of these two pulses, an adjustment back to the setting indicated by curves A and B will be necessary, as hereinbefore described.

While I have shown a reference line Z in the upper zone of the oscillograph screen, it will be recognized that this line is arbitrarily selected for the purpose of assisting the operator in maximizing the pulses in the upper region between lines X and Y. Another reference line may be provided, if desired, in the lower region below line X to assist in maximizing the weaker pulses.

Where the tube 31 is adjusted to the same or substantially the same bias of tube 30, a gain characteristic such as indicated by curve D of Fig. 7 will result. This provides much sharper gain than the two slopes of the curves indicated in Fig. 3. This sharper slope is of assistance in maximizing the weaker pulses because they are thereby more greatly amplified giving a greater swing for the maximizing operation. For this setting of the tube adjustment, the stronger pulses such as 3, 5, etc., will, of course, end on the saturation line Y. This prevents the stronger pulses from being driven off scale and therefore may be observed during the maximizing of the weaker pulses.

While I have shown and described one form of the invention only, it will be recognized that many additional forms and variations both as to apparatus and the steps of the method are possible without departing from the invention. For example, other means for varying the gain characteristics may be provided such as for varying differently the potentials of the anodes of the two tubes. It will be understood therefore, that the method and means herein disclosed are to be regarded as illustrative of the invention only and not as restricting the appended claims.

What I claim is:

1. In obstacle detection apparatus, including an oscillograph having amplitude and sweep potential deflection plates, for indicating and maximizing pulse reflections having irregular amplitudes, received in response to a transmitted pulse; the combination with said oscillograph of means for receiving said pulse reflections forming a source of signal potential, means providing an operative first voltage input region up to a predetermined voltage level acting to apply substantially constant gain to pulse amplitudes terminating below said predetermined level so that such pulses may be maximized, and to clip off the portions of pulses extending above said predetermined level, means providing an operative second voltage input region acting to apply substantially constant gain to the portion of any pulse extending into said second region, means to vary the input voltage range of said second region to selectively include therein for maximizing purpose the peak portion of any pulse extending above said predetermined level, means forming a combined input circuit from said source of signal potential to said first and to said second voltage region means, means forming a combined output circuit from said first and said second voltage region means to said amplitude deflection plates, a source of sweep potential, and means for applying said sweep potential to said sweep potential deflection plates.

2. In obstacle detection apparatus, including an oscillograph having amplitude and sweep potential deflection plates, for indicating and maximizing pulse reflections having irregular amplitudes, received in response to a transmitted pulse; the combination with said oscillograph of means for receiving said pulse reflections forming a source of signal potential, means providing an operative first voltage input region up to a predetermined voltage level acting to apply substantially constant gain to pulse amplitudes terminating below said predetermined level and to clip off the portions of pulses extending above said predetermined level, means providing an operative second voltage input region up to a second predetermined voltage level acting to apply substantially constant gain to portions of pulse amplitudes extending into said second region and to clip off the portions of pulses extending above said second predetermined level, means forming a combined input circuit from said source of signal potential to said first and to said second voltage region means, means forming a combined output circuit from said first and said second region means to said amplitude deflection plates, a source of sweep potential, and means for applying said sweep potential to said sweep potential deflection plates.

3. In obstacle detection apparatus, including an oscillograph having amplitude and sweep potential plates, for indicating and maximizing pulse reflections having irregular amplitudes, received in response to a transmitted pulse; the combination with said oscillograph of means for receiving said pulse reflections forming a source of signal potential, means providing an operative first voltage input region up to a predetermined voltage level acting to apply a substantially constant gain to pulse amplitudes terminating below said predetermined level and to clip off the portions of pulses extending above said predetermined level, means providing an operative second voltage input region up to a second predetermined voltage level acting to apply substantially constant gain to portions of pulse amplitudes extending into said second region and to clip off the portions of pulses extending above said second predetermined level, means to vary the input voltage range of said second region to selectively include the peak portion of any pulse extending above said first predetermined level whereby such pulse can be maximized while maintaining the other pulses present at observable amplitudes, means forming a combined input circuit from said source of signal potential to said first and to said second voltage region means, means forming a combined output circuit from said first and said second voltage region means to said amplitude deflection plates, a source of sweep potential, and means for applying said sweep potential to said sweep potential deflection plates.

4. In obstacle detection apparatus including an oscillograph having amplitude and sweep potential deflection plates, to indicate pulse reflections having irregular amplitudes received in response to a transmitted pulse; the combination with said oscillograph of amplifying means having two parts, one of said parts having a first gain region up to a predetermined voltage level to effect a high gain for reflection pulses terminating below said level and limited gain for reflection pulses extending above said level, and the second of said parts having a second gain region shiftable with respect to said level to apply a gain to any part of a pulse extending into said second region, means to adjust said second part to shift said second gain region to the peak portion of any pulse extending above said level, means forming an input circuit for said amplifying means, means forming an output circuit from said amplifying means to said amplitude deflection plates, a source of sweep potential, and means for applying said sweep potential to said sweep potential deflection plates.

5. The obstacle detecting apparatus as defined in claim 4 wherein the one part comprises an amplifier tube having a normally fixed grid bias and the second part comprises an amplifier tube having an adjustable grid bias.

6. In obstacle detection apparatus, including an oscillograph having amplitude deflection plates to indicate pulse reflections having irregular amplitudes received in response to a transmitted pulse; the combination with said amplitude deflection plates of amplifier means having two amplifier tubes arranged in parallel, the first tube being normally biased for operation to effect a gain for pulse amplitudes below a predetermined voltage level, and to clip off pulse amplitudes extending above said predetermined level, the second of said tubes being operative to provide an additional gain for a predetermined amplitude range, means to vary the bias of the second tube to shift the said amplitude range with respect to said predetermined voltage level to effect gain to the peak portions of pulse amplitudes extending above said predetermined level, and means for applying the output of said amplifier means to said oscillograph deflection plates.

7. A method of indicating and maximizing reflection pulses having irregular amplitudes received on an oscillograph of obstacle detection apparatus comprising applying to the received pulses an amplifying characteristic having high gain for pulse amplitudes below a predetermined voltage input level and low gain for the pulse amplitudes above said level, applying a further amplifying characteristic to add a high gain to the peak portion of a selected one of the received pulses whereby such pulse can be maximized while other pulses present are at the same time indicated at observable amplitudes, and applying an oscillatory sweep deflection to the pulses in the time sense.

8. A method of indicating and maximizing pulse reflections having irregular amplitudes received on the oscillograph of an obstacle detection apparatus comprising applying to the received pulses a first voltage input amplification up to a predetermined voltage level, applying to at least certain of the received pulses in addition to said first amplification a second voltage input amplification of a predetermined voltage range, varying the input voltage range, of said second amplification to selectively include the peak portion of received pulses, and applying an oscillatory sweep deflection to the pulses in the time sense.

9. The method of indicating and maximizing pulse reflections as defined in claim 8 wherein the variation of the input voltage range of the second amplification is made with respect to the predetermined voltage level of the first amplification.

10. The method of indicating and maximizing pulse reflections having irregular amplitudes received on the oscillograph of an obstacle detection apparatus comprising applying to the received pulses a first voltage input amplification up to a predetermined voltage level to effect a gain to impulse amplitudes below said predetermined level and to clip off the portions of pulses extending above said predetermined level, applying to at least certain of the received pulses in addition to said first amplification a second voltage input amplification up to a second voltage level to effect a gain to portions of pulses extending into the range of said second amplification and to clip off any pulse portions extending above said second predetermined level, varying the input voltage range of said second amplification to selectively include in the range thereof the peak portion of any pulse extending above said first predetermined level, and applying an oscillatory sweep deflection to the pulses in the time sense.

11. An oscillograph apparatus having amplitude and sweep deflection plates for indicating pulses of irregular amplitude comprising means providing an operative first voltage input region up to a predetermined voltage level acting to apply substantially constant gain to pulse amplitudes terminating below said predetermined level and to clip off the portions of pulses extending above said predetermined level, means providing an operative second voltage input region acting to apply substantially constant gain to the portion of any pulse extending into said second region, means to vary the input voltage range of said second region, to selectively include therein any portion of a pulse extending above said predetermined level, and means forming a combined output circuit for applying said first named and said second named means to said amplitude deflection plates.

12. An oscillograph apparatus having amplitude and sweep deflection plates for indicating pulses of irregular amplitude comprising means providing an operative first voltage input region up to a predetermined voltage level acting to apply substantially constant gain to pulse amplitudes terminating below said predetermined level and to clip off the portions of pulses extending above said predetermined level, means providing an operative second voltage input region acting to apply substantially constant gain to the portion of any pulse extending into said second region, means to vary the input voltage range of said second region to selectively include therein any portion of a pulse extending above said predetermined level, means to vary the steepness of the gain of at least one of the two regions specified whereby small variations in a pulse may be examined and small differences between two or more pulses may be compared, and means forming a combined output circuit for applying said first named and said second named means to said amplitude deflection plates.

13. A method of indicating pulses having irregular amplitudes received on an oscillograph comprising applying to the received pulses an amplifying characteristic having a selected substantially constant gain for pulse amplitudes terminating below a predetermined voltage input level, applying to selected received pulses extending above said predetermined voltage input level a further amplifying characteristic having another selected substantially constant gain, and applying an oscillatory sweep deflection to the pulses in the time sense.

14. A method of indicating pulses having irregular amplitudes received on an oscillograph comprising applying to the received pulses a first voltage amplification up to a predetermined voltage input level, applying to receive pulses extending above said predetermined voltage input level a second voltage amplification of a predetermined voltage range, varying the input voltage range of the second amplification to selectively include the peak portions of pulses extending above said predetermined level and varying selectively the amplification gain of said amplifications whereby small variations in a pulse may be examined and small differences between two or more pulses may be compared, and applying an oscillatory sweep deflection to the pulses in the time sense.

15. In an obstacle detection apparatus for indicating and maximizing pulse reflections having irregular amplitudes, received in response to transmitted pulses; the combination of means for receiving signal pulses of irregularly varying amplitude forming a source of signal potential, a first amplifier for a predetermined voltage region, a second amplifier for a second voltage region, an output circuit common to said first and said second amplifier, common means for applying said signal potential to said first and to said second amplifier, a source of sweep potential for timing purposes, an oscillograph for indicating reflection pulses having amplitude and sweep potential deflection plates, means for applying said sweep potential to said sweep potential deflection plates, and means for applying said common output circuit to said amplitude deflection plates.

16. In an obstacle detection apparatus for indicating and maximizing pulse reflections having irregular amplitudes, received in response to transmitted pulses; the combination of means for receiving said pulses forming a source of signal potential, a first amplifier for a predetermined voltage region, a second amplifier for a second voltage region, an output circuit common to said first and said second amplifier, common means for applying said signal potential to said first and to said second amplifier, means for selectively varying the effective voltage region of said second amplifier, whereby a given pulse may be maximized, a source of sweep potential for timing purposes, an oscillograph for indicating reflection pulses having amplitude and sweep potential deflection plates, means for applying said sweep potential to said sweep potential deflection plates, and means for applying said common output circuit to said amplitude deflection plates.

17. In an obstacle detection apparatus for indicating and maximizing pulse reflections having irregular amplitudes, received in response to transmitted pulses; the combination of means for receiving said pulses forming a source of signal potential, means to amplify a first and an intermediate voltage region, said intermediate voltage region extending beyond said first region, said means to amplify acting to produce a constant maximum output voltage value for any voltage input within said intermediate region, means to amplify a second voltage region beyond said intermediate region, an output circuit common to said first and said second amplifier, common means for applying said signal potential to said first and to said second amplifier, means for varying the extent of said intermediate region from zero to a maximum, whereby any pulse may be selectively amplified with respect to the portion thereof in the lower voltage region, clipped off with respect to the portion thereof in the intermediate region, and maximized with respect to the portion thereof extending into said second region, a source of sweep potential for timing purposes, an oscillograph for indicating reflection pulses having amplitude and sweep potential deflection plates, means for applying said sweep potential to said sweep potential deflection plates, and means for applying said common output circuit to said amplitude deflection plates.

NORMAN H. YOUNG, Jr.

REFERENCES CITED

The following references are of record in the file of this patent:

UNITED STATES PATENTS

| Number | Name | Date |
| --- | --- | --- |
| 2,300,189 | Wolff | Oct. 27, 1942 |
| 2,066,284 | Ballantine | Dec. 29, 1936 |
| 1,978,008 | Bussard | Oct. 23, 1934 |
| 1,993,861 | Roberts | Mar. 12, 1935 |
| 2,143,035 | Smith | Jan. 10, 1939 |